Feb. 28, 1928.

L. M. PERSONS

GAUGE

Filed July 13, 1925

1,660,814

Inventor:
Lawrence M. Persons

Patented Feb. 28, 1928.

1,660,814

UNITED STATES PATENT OFFICE.

LAWRENCE M. PERSONS, OF CHICAGO, ILLINOIS, ASSIGNOR TO COOK ELECTRIC COMPANY, OF CHICAGO, ILLINOIS, A CORPORATION OF ILLINOIS.

GAUGE.

Application filed July 13, 1925. Serial No. 43,063.

My invention relates to a measuring device and it has special reference to a pressure measuring apparatus that is particularly adapted to ascertain the contents of a container or receptacle to which it may be attached.

More particularly my invention relates to a measuring device whereby even relatively small hydrostatic pressures resulting either from a fluid or fluid body may be accurately determined.

The measuring device of my invention is a radical departure from the ordinary type of measuring device indicating hydrostatic pressures in that it is exceedingly simple and durable, as well as accurate and very reliable.

Devices of the prior art, while somewhat efficient and satisfactory in many cases, were found too expensive to be practical and commercially successful. Manufacturers will not entertain their marketing if the cost is excessive. Those who employ these devices, say on gasoline tanks of automobiles, and other liquid containers, such as fuel oil tanks of oil burning systems, will not adopt them as standard equipment if the selling price is too high. Usually, delicate pressure actuated members have been heretofore employed in connection with fluid contained chambers, the walls of which were movable. These parts in their intricate association with one another are subject to temperature changes, and, due to their movably operated relation, are apt to be easily deranged.

An object of my invention is to produce a hydrostatic pressure measuring device which will eliminate the deficiencies of prior devices, including those above referred to, and at the same time to provide means of exceeding simplicity which is certain and efficient in operation, and devoid of delicate mechanism which is apt to require constant attention and frequent repair.

In carrying out my invention, I employ means for trapping a body of air in a liquid container in a manner which exposes it to contact with the liquid so as to be exceedingly sensitive to pressure. I prefer to permit the pressure head or hydrostatic head of the body of liquid to act upon this trapped body of air and to transmit the exerted pressure to a conveniently located indicating device or gauge, which provides readings in terms of the quantity of fluid in the container.

Another aim of my invention is to provide a measuring or indicating device of the above character which is economical to manufacture and embodies an unusually simple construction with few component parts which may be readily assembled and duplicated so as to readily provide for interchangeability.

A further object of my invention resides in the construction of a measuring device which is effective to trap within the tank a pressure actuating medium without requiring the use of fastening elements that have to be riveted, or holes that must be drilled especially in the tank, in order to adapt the device thereto. This device may be quickly applied to the interior of the tank by merely lowering it to the bottom through an adapter opening in the top thereof.

More particularly my invention is directed to an improved construction, which is effective in permanently retaining the air or pressure actuating medium thus trapped, and which comprises a column of air or the like within a tube, the latter extending from the gauge to the pressure transmitting device submerged in the liquid and connecting to the pressure transmitting device in a manner effectively preventing the escape of air held therein. Hence, this eliminates the necessity of air pumps, which have heretofore been used to replenish the air, and assures an apparatus which correctly indicates the contents of the tank without the employment of auxiliary apparatus for correcting its readings at frequent intervals, due to said air leaking.

Other objects and advantages of my invention will be apparent from the following description when taken in connection with the accompanying drawing which forms a part hereof.

Figure 1:
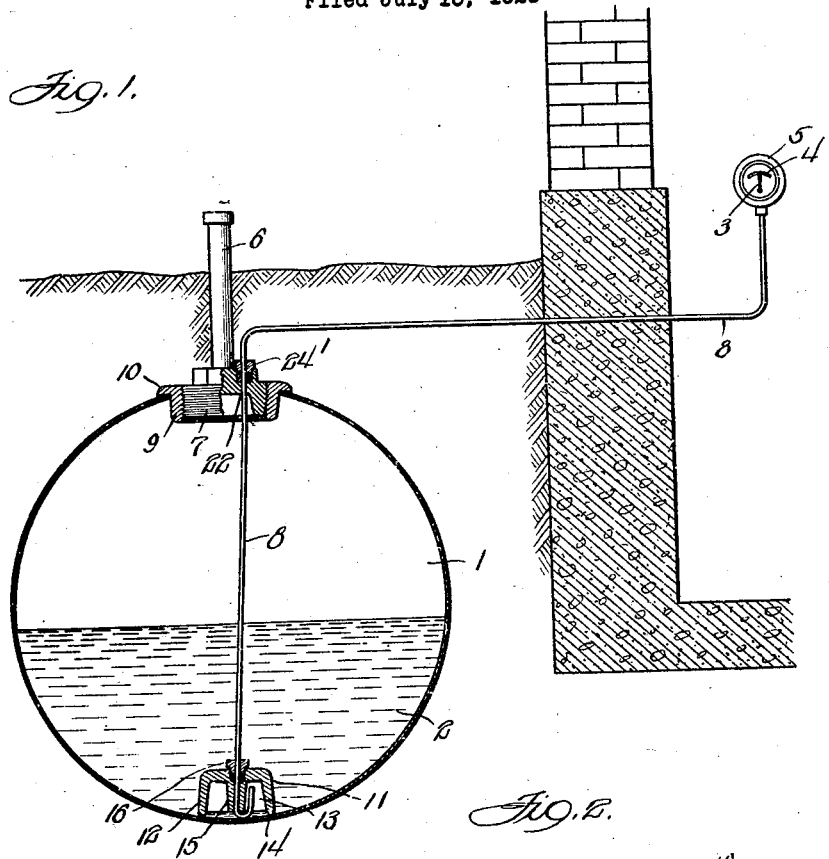
Figure 1 is a diagrammatic view of a receptacle or container, such as a fuel oil tank of an oil burning system, showing my improved pressure measuring device attached thereto for determining the fluid contents of the tank.
Figure 2:
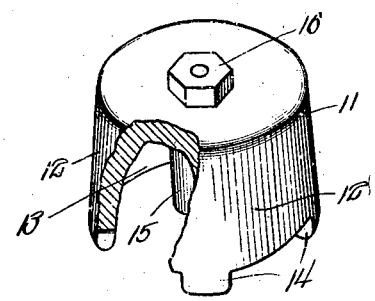
Fig. 2 is a perspective view of that portion of the pressure measuring device which is located within the tank.

Referring to the drawings, I have shown an exceedingly simple device for indicating the hydrostatic pressures of a tank adapted for use in various systems where it is desirable to indicate exteriorly the fluid contents of the tank.

In Fig. 1, I have shown a receptacle or tank 1 which contains a body of liquid 2 that it is desired to measure, the amount of the liquid in the tank being indicated by an indicator 3 cooperating with a suitable calibrated scale 4 comprised in an indicating instrument 5. The indicating instrument 5 may be remote from the tank 1. For the sake of illustration in the present disclosure, I have embodied my invention in a tank employed particularly in oil burning systems wherein it is usually required to bury the tank in the ground outside of the building. The depth of the tank below the surface of the ground depends, of course, on the extent to which the ground freezes during cold weather. A filling pipe 6 usually extends vertically to the surface, so as to permit the tank to be readily filled outside of the building. Tank 1 is provided with a removable cap or adapter 7, through which a connector 8 leads from the indicating instrument 5.

Connector 8 may be a hollow copper tube of any desired cross sectional area. Adapter cap 7 is threaded into a closure member 9 suitably arranged to seat within an opening 10 furnished in the top of tank 1. A pressure transmitting device is disposed in the bottom of tank 1. This pressure transmitting device, in the present disclosure, comprises a bell shaped member 11 having a downwardly extending exterior wall 12 to provide an air chamber 13 within the bell 11. I preferably provide a plurality of feet 14 at various points about the lower edge of this wall 12, which loosely seat upon the interior of tank 1. In order for the copper tubing 8 to communicate with the air chamber 13, a centrally disposed apertured lug 15 is formed on bell 11. Through the aperture of the lug 15 the copper tubing 8 may be passed. After the tubing has been pulled through the proper distance, the lower end thereof may be bent, as shown in Fig. 1, in an upward direction, so that the open end thereof will always be in communication with air confined within chamber 13. A suitable packing nut 16 holds tubing 8 in fixed relation to bell 11. Packing nut 16 is also centrally apertured and threads into a suitable tap provided in the top of bell 11.

Figure 3:
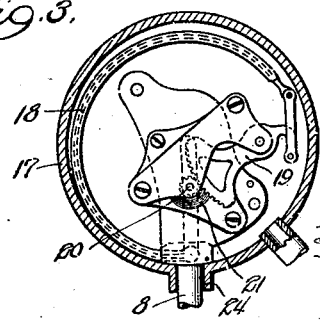
Fig. 3 is a view showing the internal mechanism of a standard pressure actuated gauge element that may serve as the indicating instrument for my pressure device.

Referring to Fig. 3, the indicating instrument 5 is shown as comprising a casing 17, in which an expansible pressure actuated or Bourdon element 18 is housed. The pressure actuated element 18 communicates at its lower end with the connector 8 and variations in the pressures transmitted to the element 18 through the connector 8 cause it to expand and contract in a manner to swing a rotatable arm 19, which in turn actuates the indicator 3, which is attached to a rotatably mounted shaft 20. Shaft 20 is controlled by coil torsion spring 21. Since the pressure gauge illustrated in Fig. 3 is of a well known type of construction, further explanation thereof is not necessary. It is apparent, of course, that other forms of pressure indicating instruments may be used instead of the type described and illustrated herein.

When it is desired to mount the device embodying my invention on a tank, provision is first made to accommodate the adapter ring 9 carrying the adapter cap 7. Adapter cap 7 is preferably furnished with an opening 22 through which the connector or tubing 8 passes. A packing nut 24 serves to hold the tubing 8 in tight relation with adapter 7. The tubing is first threaded on the adapter by means of the packing nut, a sufficient amount of tubing being first drawn through the opening 22 to permit bell 15 to be lowered to the bottom of tank 1. After tubing 8 is threaded through adapter 7 in the manner just described, the end of tubing 8, as a practical matter, should be cut off so as to allow a free air vent at this open end. It is then passed through the apertured lug 15 on bell 11. The end of tubing 8 is drawn far enough through this lug 15 to permit it to be bent U-shaped, so as to bring the open end near the top of the chamber 13. Tubing 8 is suitably secured to the bell 11 by means of the packing nut 16. The next step in mounting this device is to lower the bell in tank 1 until it loosely seats on the bottom of the tank. It is preferable to be sure that there is no slack tubing between this bell and the adapter. When lowering the bell, it should be maintained in a horizontal position, so that it may trap its full capacity of air in chamber 13. Due to its exterior walls 12, it is difficult to lose the body of air in chamber 13 after it is once trapped therein. This is true, notwithstanding the fact that tank 1 may be entirely empty. In the event that tank 1 is entirely empty, it will be readily observed that during the refilling of the tank a pocket of air will be maintained in the air chamber because there is no means of escape for the air through the top of the bell when horizontally positioned.

From the foregoing description it will be apparent that with the indicating instrument 5 in communication with the air chamber 13 by means of the connector 8, variations of hydrostatic pressure of fluid 2 may be transmitted through tubing 8 to gauge 5. I wish to point out that one side of the body of air trapped in chamber 13 is in open contact with the liquid 2. This brings the pressure transmitting medium (air) in the closest possible relation with the pressure to be measured. The pressure is exerted directly on this pressure indicating medium, and consequently, inaccuracies resulting in the effective transmission of pressure are reduced to a minimum. This distinguishes the present device from prior art structures where one or more flexible plates are provided to transmit the exerted pressure of the liquid before it reaches the pressure transmitting medium. It will be seen that the use of such pressure plates will cause considerable trouble and result in indefinite readings at the gauge 5, due to temperature changes and possible derangement of mechanical connections.

The device shown herein is simple and efficient.

The readings taken by it have been found to be extremely accurate, notwithstanding temperature changes and vibrations or jarring, to which a device of this character is usually subjected. It will be observed that no pivotal connections are provided between the gauge and the bell and that all movable parts are eliminated in the bell itself.

I further wish to point out that my device may be applied to any type of tank and that it is not necessary, preliminary to the mounting of this device, to change or alter the construction of the tank. The only connection to the tank is at the opening 10 in the top of the tank. The pressure measuring device comprising the bell is preferably not mechanically connected to the tank, because it is desirable to reduce the cost of this device to a minimum. However, if it is deemed desirable, this bell member 11 may be connected to the bottom of the tank.

It is not necessary to replenish the air in chamber 13, because there is no possibility of it leaking therefrom. The lug 15 is preferably integral with bell 11 so as to eliminate a joint at this point. Connector 8 is continuous from gauge 5, the connection therewith being soldered or otherwise suitably sealed at 24 to provide a fluid tight connection. From this point to the air chamber, connector 8 is furnished as a single piece. It enters bell 11 and extends down and then up in a U-shaped bend into chamber 13. Lug 15 may project downwardly at least to the bottom of chamber 13. With this formation of the bell at the point where connector 8 enters, it is obvious that there is no possibility of air leaking from chamber 13. Packing nut 16 primarily serves to hold connector 8 fastened to the bell, while the integrally extended lug 15 eliminates the employment of a joint between the connector and bell. Hence, I consider the U bend of connector 8 of considerable importance.

While a single embodiment of my invention has been shown and described in great detail, it is obvious to those skilled in the art that modifications and alterations may be made without departing from the spirit and scope of the invention.

I claim:

1. In combination, a liquid container, means for measuring the liquid contents of said container, said means including a pressure transmitting device and a pressure indicating device, a connector between said devices, said pressure transmitting device including a bell-like element having an open bottom and a closed top whereby air may be trapped therein when lowered in said container, and means on said element permitting said connector to pass through said top and into said air, said means comprising an interiorly downwardly projecting apertured lug through which said connector is extended and thereafter is bent upwardly into said air.

2. In combination, a liquid container, means for measuring the liquid contents of said container, said means including a pressure transmitting device having a pressure transmitting medium subject to the pressure to be measured, a pressure indicating device, and a connector between said devices, said connector extending downwardly into said container and communicating with the interior of said pressure transmitting device by an upwardly extending portion entering the pressure transmitting medium from below.

3. In combination, a liquid container, means for measuring the liquid contents of said container, said means including a pressure transmitting device having a pressure transmitting medium therein subject to the pressure to be measured, a gauge, a connection for said pressure transmitting medium between said device and said gauge, said connection comprising a tube having a U bend at the end thereof adapted to project into said pressure transmitting medium from the lower side of the chamber containing said medium.

4. In combination, a liquid container, means for measuring the liquid contents of said container, said means including a pressure transmitting device having a chamber therein for a pressure transmitting medium subject to the pressure to be measured, an indicating gauge, a tube between said device and said gauge, said pressure transmitting device being arranged to expose the lower end of said chamber to the liquid in said container, and an apertured extension on said device leading through the chamber to the lower exposed end thereof, said tube passing through said apertured extension and having a U bend formed therein extending into the chamber for communication with said pressure transmitting medium.

5. In combination, a liquid container, means for measuring the liquid contents of said container, said means including a pressure transmitting device having a chamber therein for a pressure transmitting medium subject to the pressure to be measured, an indicating gauge, and a connector between said device and said gauge, said connector entering said chamber from its lower end within said container.

6. In combination, a liquid container, means for measuring the liquid contents of said container, said means including a pressure transmitting device in said container, an indicating gauge and a connector extending from said gauge to said device and entering said device at its lower end, said lower end within said container of the connector being bent upwardly to extend into said device.

7. In combination, a liquid container, means for measuring the liquid contents of said container, said means including a pressure transmitting device adapted to trap a body of air therein with the lower side of the body of air exposed to the pressure to be measured, an indicating gauge, and a connector between said gauge and said device, said connector entering said body of air from said lower side exposed to the pressure to be measured.

In witness whereof, I have hereunto subscribed my name.

LAWRENCE M. PERSONS.

CERTIFICATE OF CORRECTION.

Patent No. 1,660,814.                              Granted February 28, 1928, to

LAWRENCE M. PERSONS.

It is hereby certified that Certificate of Correction issued May 8, 1928, in the above numbered patent was erroneously drawn as to claim 6, and that this Certificate should have read as follows: Page 4, line 21, claim 6, strike out the words "within said container" and insert the same after the word "end" and before the comma in line 20, that the said Certificate may conform to the record of the office.

Signed and sealed this 29th day of May, A. D. 1928.

(Seal)

M. J. Moore,
Acting Commissioner of Patents.